United States Patent
Zhu et al.

(10) Patent No.: US 12,546,464 B2
(45) Date of Patent: Feb. 10, 2026

(54) FLEXIBLY REMOVABLE EAVES LAMP

(71) Applicant: SHENZHEN LINGKE TECHNOLOGY CO., LTD., Shenzhen (CN)

(72) Inventors: Yuliang Zhu, Chongqing (CN); Donglian Xie, Fuzhou (CN); Zhiqiang Wu, Shenzhen (CN)

(73) Assignee: SHENZHEN LINGKE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/235,643

(22) Filed: Jun. 12, 2025

(65) Prior Publication Data

US 2025/0383072 A1   Dec. 18, 2025

(30) Foreign Application Priority Data

Jun. 12, 2024   (CN) .......................... 202421341261.5

(51) Int. Cl.
*F21V 19/00* (2006.01)
*F21V 7/00* (2006.01)
*F21V 21/02* (2006.01)

(52) U.S. Cl.
CPC ............... *F21V 21/02* (2013.01); *F21V 7/00* (2013.01); *F21V 19/0045* (2013.01)

(58) Field of Classification Search
CPC .................................................. F21V 19/0045
See application file for complete search history.

(56) References Cited

U.S. PATENT DOCUMENTS

2012/0002427 A1\*   1/2012   Moon ................. F21V 19/0015
362/382

\* cited by examiner

*Primary Examiner* — Sean P Gramling
(74) *Attorney, Agent, or Firm* — Jose Cherson Weissbrot

(57) ABSTRACT

The present application proposes a flexibly removable eaves lamp, including a lamp body and a mount. A bottom of the lamp body is provided with a first vertically limiting portion and a first horizontally limiting portion. The first vertically limiting portion extends in a first horizontal direction of the lamp body, and the first horizontally limiting portion is arranged on the first vertically limiting portion. A top of the mount is provided with a second vertically limiting portion and a second horizontally limiting portion. The second vertically limiting portion extends in a first horizontal direction of the mount, and the second horizontally limiting portion is arranged on the second vertically limiting portion. The second vertically limiting portion engages with the first vertically limiting portion in a horizontally slidable manner, and the second horizontally limiting portion removably engages with the first horizontally limiting portion.

9 Claims, 7 Drawing Sheets

FLEXIBLY REMOVABLE EAVES LAMP

TECHNICAL FIELD

The present application relates to an eaves lamp, and in particular to a flexibly removable eaves lamp.

BACKGROUND

Eaves lamps are commonly used outdoors decorative lighting fixtures, and are widely used to decorate walls, eaves, fences, corridors, and other exterior courtyard areas. The shapes and sizes of the eaves lamps vary, and one can choose the corresponding type according to actual requirements.

SUMMARY

An embodiment of the present application provides a flexibly removable eaves lamp, in order to solve the problems existing in related art. A technical solution is described as follows.

An embodiment of the present application provides a flexibly removable eaves lamp, including:
- a lamp body, a bottom of the lamp body being provided with a first vertically limiting portion and a first horizontally limiting portion, the first vertically limiting portion extending in a first horizontal direction of the lamp body, and the first horizontally limiting portion being arranged on the first vertically limiting portion; and
- a mount, a top of the mount being provided with a second vertically limiting portion and a second horizontally limiting portion, the second vertically limiting portion extending in a first horizontal direction of the mount, the first horizontal direction of the mount and the first horizontal direction of the lamp body being the same direction, and the second horizontally limiting portion being arranged on the second vertically limiting portion,
- where the second vertically limiting portion engages with the first vertically limiting portion in a horizontally slidable manner to limit a vertical movement of the lamp body, and the second horizontally limiting portion removably engages with the first horizontally limiting portion to limit a horizontal movement of the lamp body.

BRIEF DESCRIPTION OF THE DRAWINGS

In accompanying drawings, the same reference signs denote the same or similar components or elements throughout multiple drawings unless otherwise specified. These drawings are not necessarily drawn to scale. It should be understood that these drawings depict only some implementations according to the present application and should not be construed as limiting the scope of the present application.

LIST OF REFERENCE SIGNS

100. Eaves lamp; 1. Lamp body; 11. Base; 111. First vertically limiting portion; 1111. First vertically extending section; 1112. First horizontally extending section; 1113. First guide groove; 112. First horizontally limiting portion; 12. Circuit board; 121. Light source; 13, Reflector Cup; 14. Lamp cover; 2. Mount; 21. Second vertically limiting portion; 211. Second vertically extending section; 212. Second horizontally extending section; 2121. First connecting section; 2122. Second connecting section; 2123. Third connecting section; 213. Second guide groove; 22. Second horizontally limiting portion; 23. Mounting guide groove; 1111a. First end of first vertically extending section; 1111b. Second end of first vertically extending section; 112a. Limiting slot; 22a. Limiting protrusion; 22b. Arc-shaped portion.

DETAILED DESCRIPTION OF EMBODIMENTS

Only some exemplary embodiments are briefly described below. As can be appreciated by those skilled in the art, modifications may be made to the described embodiments in various ways without departing from the spirit or scope of the present application. Therefore, the accompanying drawings and the description are considered as exemplary in nature rather than limiting.

Figure 4:
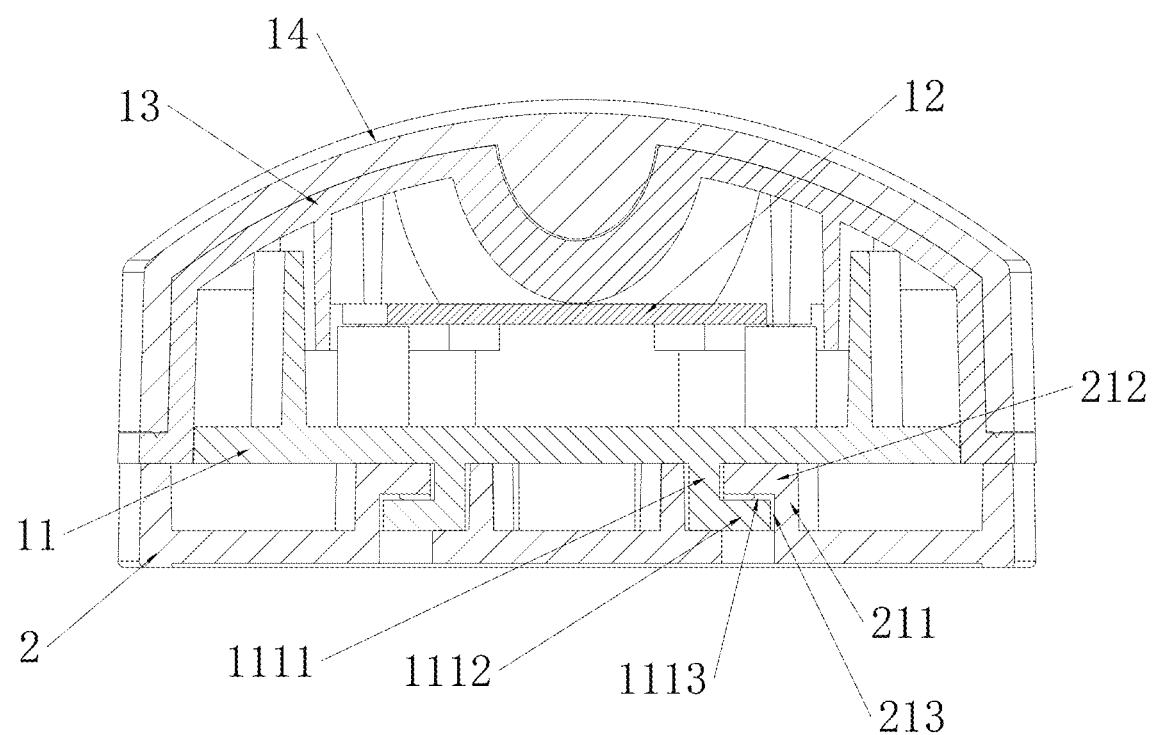
FIG. 4 is a cross-sectional view of an eaves lamp according to an embodiment of the present application from a second perspective.
Figure 5:
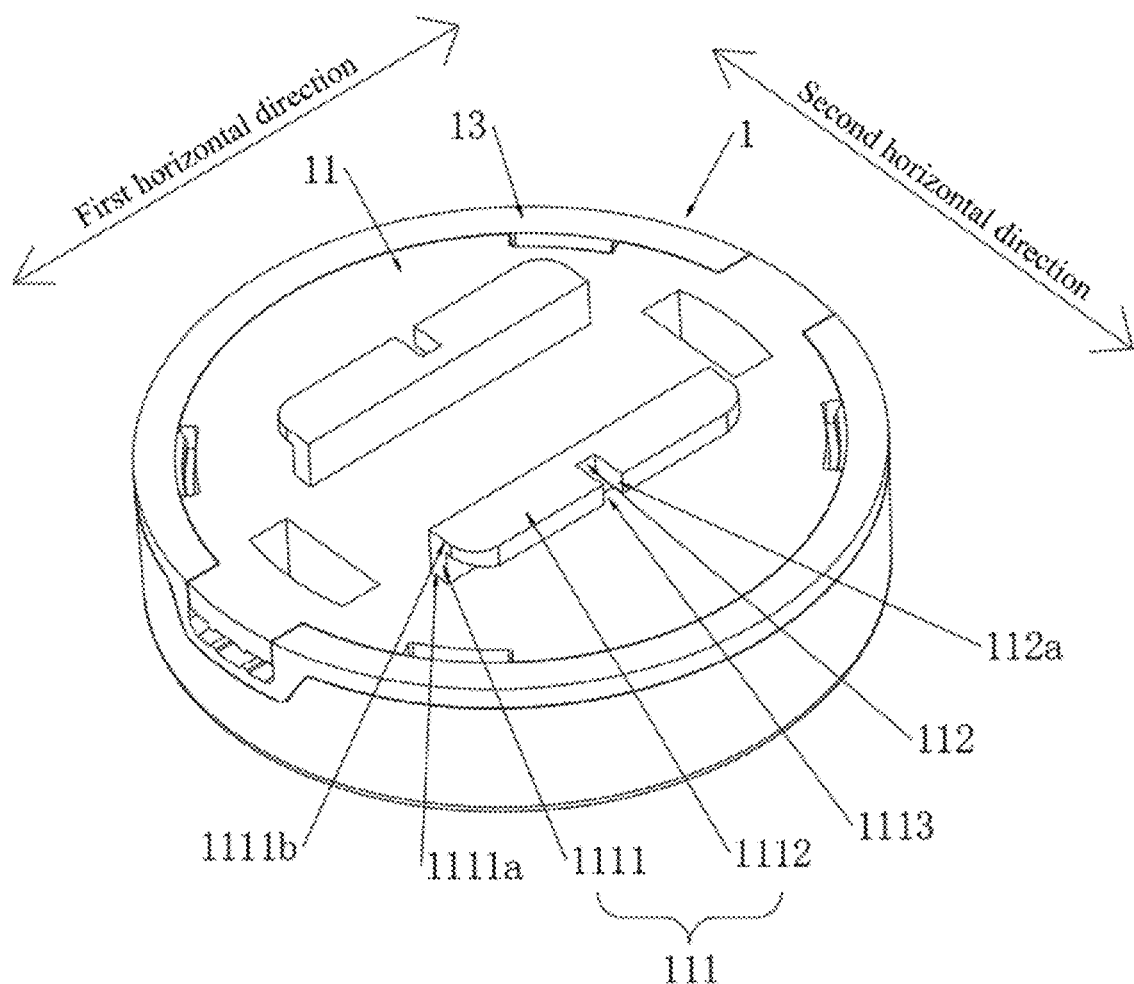
FIG. 5 is a structural schematic perspective view of a lamp body according to an embodiment of the present application.

Referring to FIGS. 1-7, there is shown a flexibly removable eaves lamp 100 according to an embodiment of the present application, including:
- a lamp body 1, a bottom of the lamp body 1 being provided with a first vertically limiting portion 111 and a first horizontally limiting portion 112, the first vertically limiting portion 111 extending in a first horizontal direction of the lamp body 1, and the first horizontally limiting portion 112 being arranged on the first vertically limiting portion 111, the first horizontal direction of the lamp body is shown in FIG. 5, and the vertical direction refers to the thickness direction of the lamp body; and
- a mount 2, a top of the mount 2 is provided with a second vertically limiting portion 21 and a second horizontally limiting portion 22, the second vertically limiting portion 21 extending in a first horizontal direction of the mount 2, and the second horizontally limiting portion 22 being arranged on the second vertically limiting portion 21. The top of the mount 2 is the side of the mount 2 facing the lamp body 1, and the bottom of the lamp body 1 is the side of the lamp body 1 facing the mount 2.

The second vertically limiting portion 21 engages with the first vertically limiting portion 111 in a horizontally slidable manner to limit a vertical movement of the lamp body 1, and the second horizontally limiting portion 22 removably engages with the first horizontally limiting portion 112 to limit a horizontal movement of the lamp body 1.

The eaves lamp 100 of the present application includes the lamp body 1 and the mount 2. The bottom of the lamp body 1 is provided with the first vertically limiting portion 111 and the first horizontally limiting portion 112, the top of the mount 2 is provided with the second vertically limiting portion 21 and the second horizontally limiting portion 22, and the second vertically limiting portion 21 engages with the first vertically limiting portion 111 in a horizontally slidable manner, to enable the first vertically limiting portion 111 to be inserted into the second vertically limiting portion 21 in the first horizontal direction of the lamp body 1, so as to limit the vertical movement of the lamp body 1 relative to the mount 2. Moreover, since the first horizontally limiting portion 112 is arranged on the first vertically limiting portion 111 and the second horizontally limiting portion 22 is arranged on the second vertically limiting portion 21, the first horizontally limiting portion 112 can removably engage with the second horizontally limiting portion 22 as the first vertically limiting portion 111 engages with the second vertically limiting portion 21, to limit the horizontal movement of the lamp body 1 relative to the mount 2. By limiting the vertical movement of the lamp body 1 in combination with limiting the horizontal movement of the lamp body 1, the secure fixing of the lamp body 1 on the mount 2 is achieved, instead of adhesive fixing by means of a 3M double-sided tape or mechanical fixing by driving a screw into a mounting hole. Moreover, since the second vertically limiting portion 21 engages with the first vertically limiting portion 111 in a horizontally slidable manner and the second horizontally limiting portion 22 removably engages with the first horizontally limiting portion 112, the lamp body 1 can be removed from the mount 2, thereby facilitating the flexible mounting, removal and replacement of the lamp body 1 and improving the convenience of use.

Referring to FIGS. 4 and 5, in an implementation, the first vertically limiting portion 111 includes:

- a first vertically extending section 1111, a first end 1111a of the first vertically extending section 1111 being connected to the bottom of the lamp body 1; and
- a first horizontally extending section 1112, a first end of the first horizontally extending section 1112 being connected to a second end 1111b of the first vertically extending section 1111, and a second end of the first horizontally extending section 1112 extending in a direction away from the second end 1111b of the first vertically extending section 1111. The first horizontally extending section 1112, the first vertically extending section 1111 and the lamp body 1 enclose a first guide groove 1113 therebetween. That is, the first vertically limiting portion 111 is L-shaped.

Figure 6:
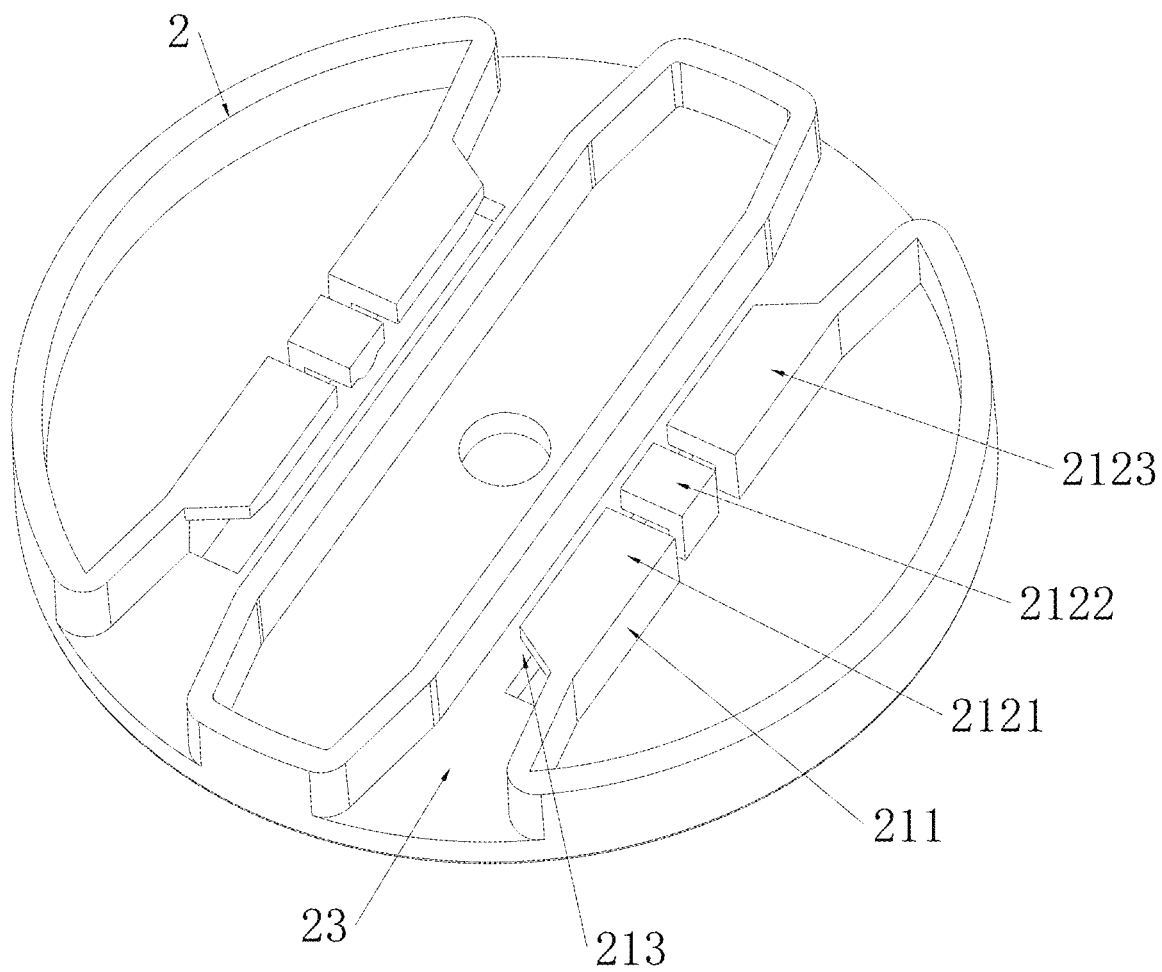
FIG. 6 is a structural schematic perspective view of a mount according to an embodiment of the present application from a first perspective.
Figure 7:
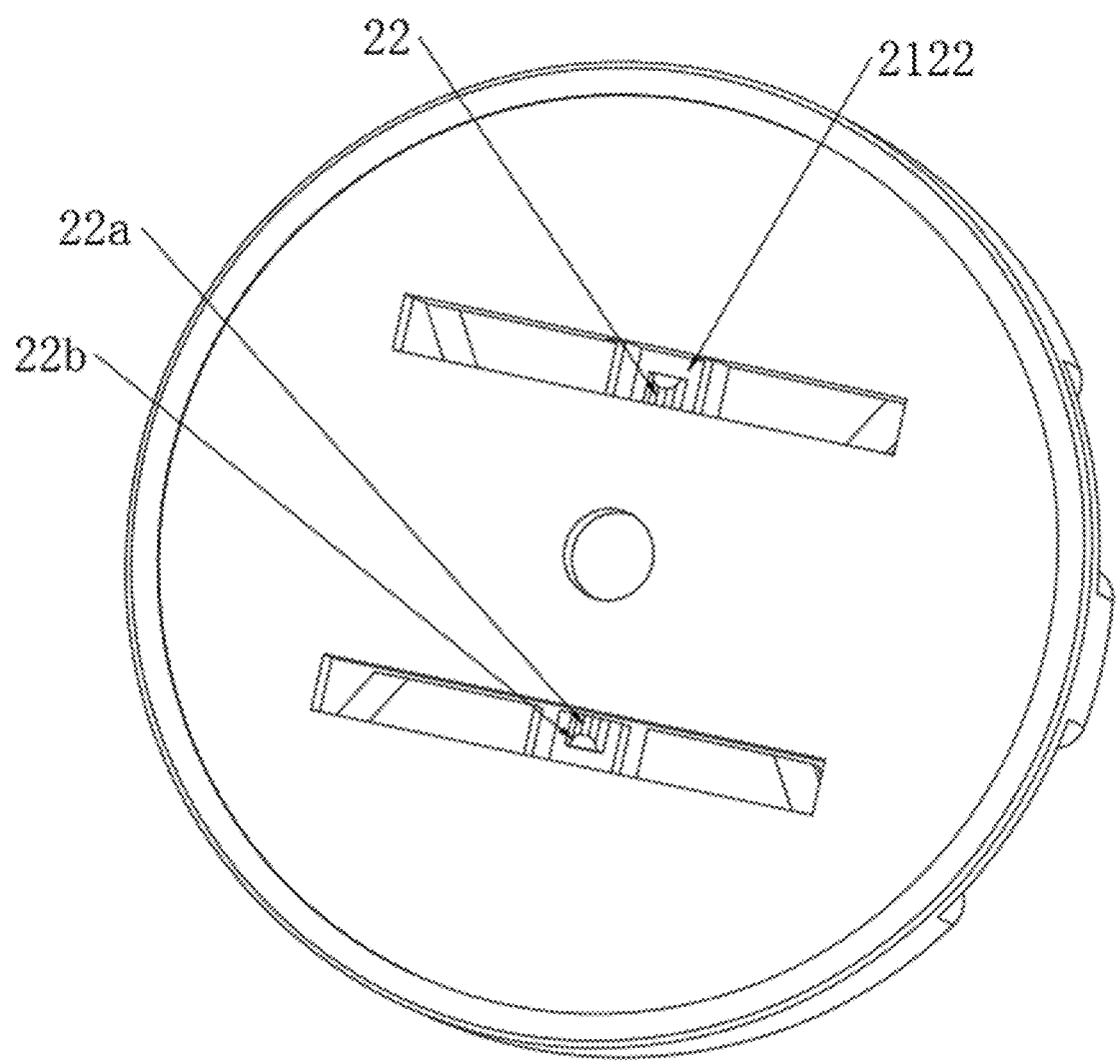
FIG. 7 is a structural schematic perspective view of a mount according to an embodiment of the present application from a second perspective.

Referring to FIGS. 4 and 6-7, the second vertically limiting portion 21 includes:

- a second vertically extending section 211, a first end of the second vertically extending section 211 being connected to the mount 2; and
- a second horizontally extending section 212, a first end of the second horizontally extending section 212 being connected to a second end of the second vertically extending section 211, and a second end of the second horizontally extending section 212 extending in a direction away from the second end of the second vertically extending section 211. The second horizontally extending section 212, the second vertically extending section 211 and the mount 2 enclose a second guide groove 213 therebetween. That is, the second vertically extending section 211 is inverted L-shaped.

The second horizontally extending section 212 engages with the first guide groove 1113 in a horizontally slidable manner, and the second guide groove 213 engages with the first horizontally extending section 1112 in a horizontally slidable manner, to limit the vertical movement of the lamp body 1. In this way, during mounting, the first vertically limiting portion 111 is aligned with the second vertically limiting portion 21, the lamp body 1 is then pushed into the mount 2, the second horizontally extending section 212 slides horizontally along the first guide groove 1113, and the first horizontally extending section 1112 slides horizontally along the second guide groove 213 until the second horizontally limiting portion 22 engages with the first horizontally limiting portion 112, so that the lamp body 1 can be fixed to the mount 2. The mounting guidance of the lamp body 1 can be achieved by using the horizontal slidable engagement between the second horizontally extending section 212 and the first guide groove 1113 and the horizontal slidable engagement between the first horizontally extending section 1112 and the second guide groove 213, so that the mounting is smoother and the mounting efficiency can be improved. During removal, the lamp body 1 is pushed out of the mount 2, the second horizontally extending section 212 slides horizontally along the first guide groove 1113, and the first horizontally extending section 1112 slides horizontally along the second guide groove 213 until the second horizontally limiting portion 22 disengages from the first horizontally limiting portion 112, so that the lamp body 1 can be removed from the mount 2. The removal guidance of the lamp body 1 can be achieved by using the horizontal slidable engagement between the second horizontally extending section 212 and the first guide groove 1113 and the horizontal slidable engagement between the first horizontally extending section 1112 and the second guide groove 213, so that the removal is smoother and the removal efficiency can be improved.

Figure 1:
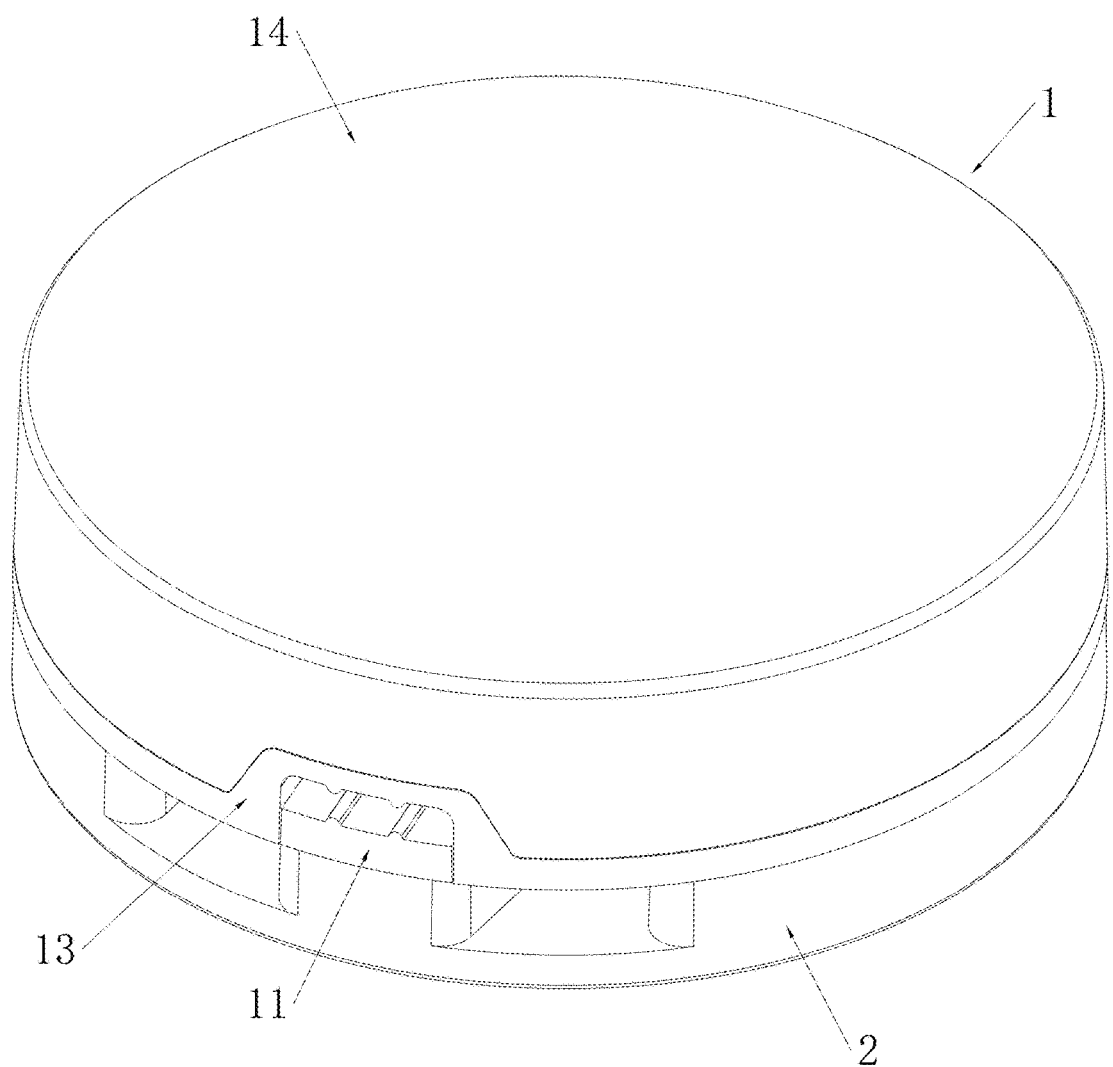
FIG. 1 is a structural schematic perspective view of an eaves lamp according to an embodiment of the present application.
Figure 2:
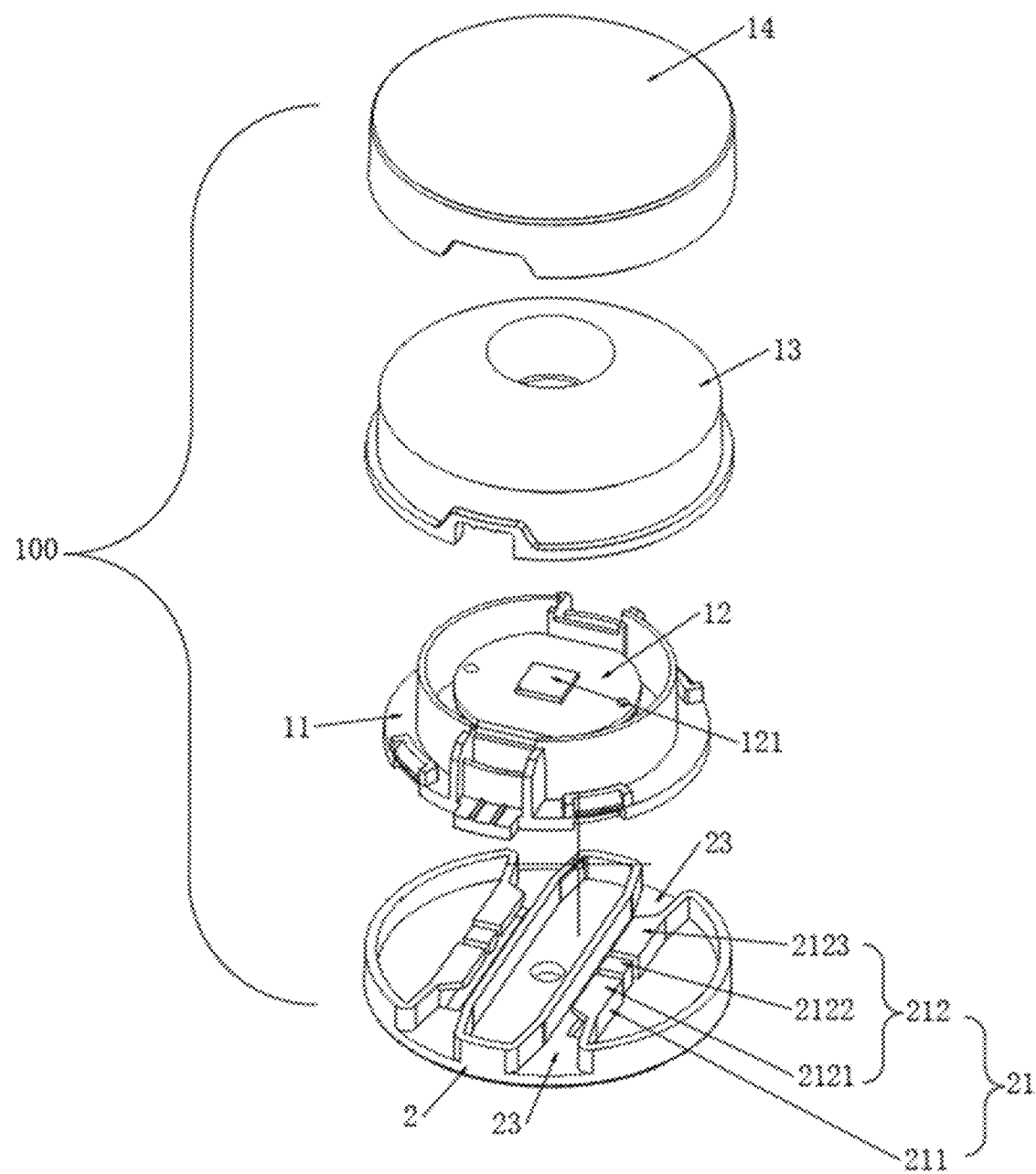
FIG. 2 is an exploded view of an eaves lamp according to an embodiment of the present application.
Figure 3:
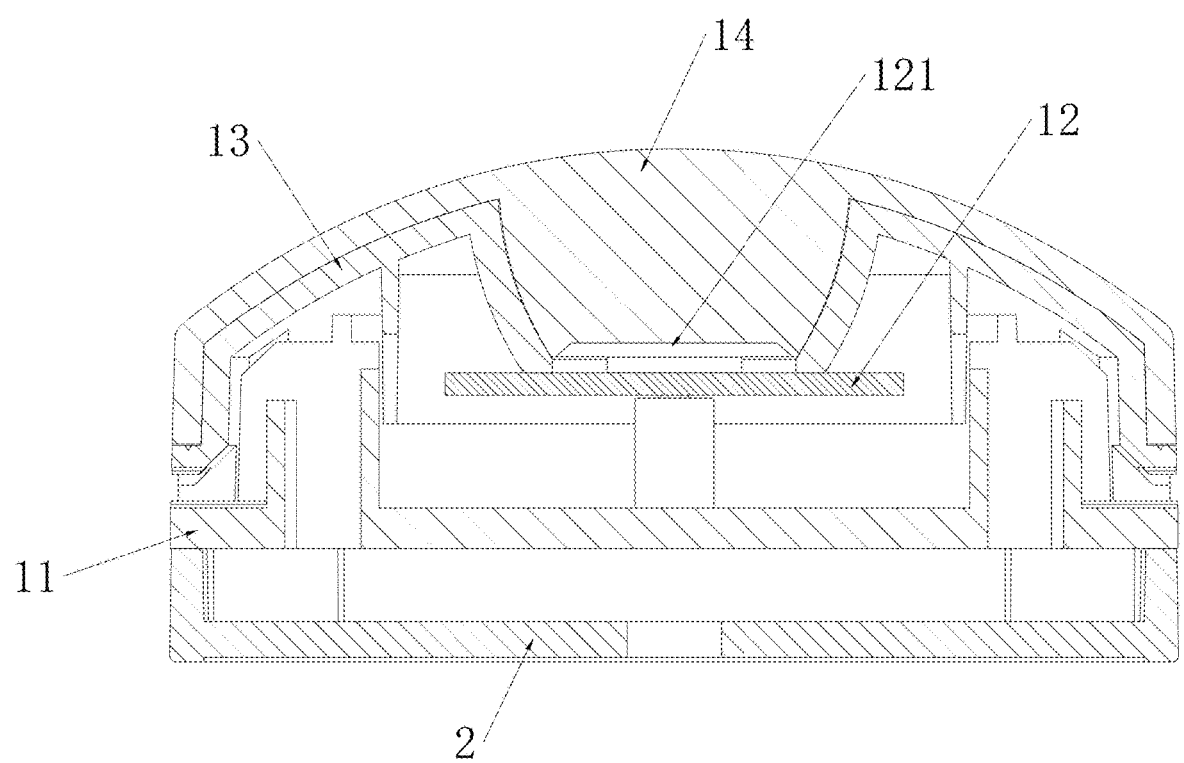
FIG. 3 is a cross-sectional view of an eaves lamp according to an embodiment of the present application from a first perspective.

Referring to FIGS. 2 and 6, in an implementation, the mount 2 has a mounting guide groove 23. The mounting guide groove 23 and the second guide groove 213 are arranged sequentially in the first horizontal direction of the mount 2. A width of the mounting guide groove 23 gradually decreases from outside to inside, and a narrower end of the mounting guide groove 23 is in communication with the second guide groove 213. Since the width of the mounting guide groove 23 gradually decreases from the outside to the inside such that the mounting guide groove 23 has a wider outer end and a narrower inner end, during mounting of the lamp body 1, the mounting guide groove 23 having a wider outer end can allow the first vertically limiting portion 111 to pass into the second vertically limiting portion 21 more easily, and can function as a mounting guide, make the mounting of the lamp body 1 smoother and more convenient.

Referring to FIGS. 2 and 6, in an implementation, two mounting guide grooves 23 are provided. The two mounting guide grooves 23 are respectively arranged at two ends of the second guide groove 213 in a length direction thereof, such that the lamp body 1 can pass into the second vertically limiting portion 21 from either end thereof in the first horizontal direction, further improving the ease of mounting.

Referring to FIGS. 5 and 7, in an implementation, the first horizontally limiting portion 112 includes a limiting slot 112a, and the second horizontally limiting portion 22 includes a limiting protrusion 22a. The limiting protrusion 22a removably engages with the limiting slot 112a. The limiting structure composed of the limiting protrusion 22a and the limiting slot 112a has a simple overall structure, high connection reliability, and low mounting and removal difficulty, so that the mounting and removal efficiency of the lamp body 1 can be improved.

In an implementation, outer edges on two horizontal sides of an end of the limiting protrusion 22a facing away from the second vertically limiting portion 21 are each provided with an arc-shaped portion 22b. The arc-shaped portion 22b extends from one end to the other end of the limiting protrusion 22a in a width direction of the second guide groove 213. The provision of the arc-shaped portions 22b can avoid the problem of the limiting protrusion 22a and the limiting slot 112a getting stuck during removal, and ensure that the limiting protrusion 22a can be smoothly mounted to and removed from the limiting slot 112a, so that the ease of mounting and removal of the lamp body 1 can be further improved.

In an implementation, the limiting protrusion 22a has a cross-section tapering in a direction away from the second vertically limiting portion 21, so that the limiting protrusion 22a is formed into a tapered structure. The limiting protrusion 22a of the tapered structure can reduce the difficulty of mounting and removal between the limiting protrusion and the limiting slot 112a, making the mounting and removal of the lamp body 1 smoother and more convenient.

Referring to FIGS. 2 and 6, in an implementation, the limiting slot 112a is provided in the first horizontally extending section 1112.

The second horizontally extending section 212 includes a first connecting section 2121, a second connecting section 2122 and a third connecting section 2123. The first connecting section 2121, the second connecting section 2122 and the third connecting section 2123 are arranged spaced apart from one another in a length direction of the second horizontally extending section 212, and the limiting protrusion 22a is provided on the second connecting section 2122. Since the first connecting section 2121, the second connecting section 2122 and the third connecting section 2123 are arranged spaced apart from one another in the length direction of the second horizontally extending section 212 so that the second connecting section 2122 is disconnected from the first connecting section 2121 and the second connecting section 2122 is disconnected from the third connecting section 2123, the second connecting section 2122 has a certain elasticity, and the second connecting section 2122 can vertically move in the second guide groove 213. Moreover, since the limiting protrusion 22a is located on the second connecting section 2122, the limiting protrusion 22a can also vertically move in the second guide groove 213, so that when the limiting protrusion 22a engages with the limiting slot 112a, the vertical movement of the limiting protrusion 22a can be urged by pushing the lamp body 1 to move away from the mount 2, to disengage the limiting protrusion 22a from the limiting slot 112a, thereby lowering the difficulty of mounting and removal between the limiting protrusion 22a and the limiting slot 112a, and making the mounting and removal more labor-saving and convenient.

In other implementations, the limiting protrusion 22a may be provided on the first horizontally limiting portion 112, and the limiting slot 112a may be provided in the second horizontally limiting portion 22.

In order to improve the stability of the connection between the lamp body 1 and the mount 2, in an implementation, two first vertically limiting portions 111 are provided. The two first vertically limiting portions 111 are arranged spaced apart from each other in a second horizontal direction of the lamp body 1, and each of the first vertically limiting portions 111 is provided with the first horizontally limiting portion 112.

Two second vertically limiting portions 21 are provided. The two second vertically limiting portions 21 are arranged spaced apart from each other in a second horizontal direction of the mount 2, each of the second vertically limiting portions 21 is provided with the second horizontally limiting portion 22, and each of the second vertically limiting portions 21 slidably engages with a corresponding first vertically limiting portion 111, and each of the second horizontally limiting portions 22 removably engages with a corresponding first horizontally limiting portion 112.

In other implementations, the number of first vertically limiting portions 111 and the number of second vertically limiting portions 21 may each be one or three or more.

Referring to FIGS. 1-4, in an implementation, the lamp body 1 includes:

a base 11, the base 11 being provided with a first vertically limiting portion 111 and a first horizontally limiting portion 112;

a circuit board 12, the circuit board 12 being arranged on a top of the base 11, and the circuit board 12 having a light source 121;

a reflector cup 13, the reflector cup 13 being arranged on the base 11, and the reflector cup 13 surrounding the light source 121; and a lamp cover 14, the lamp cover 14 being connected to an outer edge of the reflector cup 13, the lamp cover 14 covering the reflector cup 13 and the light source 121, and the lamp cover 14 being configured to allow light from the light source 121 to pass out of the lamp body 1. The base 11, the circuit board 12, the reflector cup 13 and the lamp cover 14 form a modular structure of the lamp body 1, making the mounting of the lamp body 1 convenient. Moreover, the reflector cup 13 surrounds the light source 121, so that light emitted by the light source 121 can be reflected, thereby improving the light condensing effect and the light source efficiency, and thus enhancing the illumination effect and increasing the irradiation distance. Furthermore, since the light emitted by the light source 121 is emitted along the reflector cup 13, the emission angle is fixed, and the eaves lamp 100 can be controlled to emit light at a certain angle, thereby achieving the best effect of decorative lighting.

In an implementation, the reflector cup 13 is snap-connected to the base 11 so that the reflector cup 13 and the base 11 are securely fixed together, and the lamp cover 14 and the reflector cup 13 are ultrasonically fixed together so that the lamp cover 14 and the reflector cup 13 are securely fixed together.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present application. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are merely used for the purpose of illustration, and cannot be construed as indicating or implying relative importance or implicitly indicating the number of technical features indicated. Thus, the features defined with "first" and "second" may explicitly or implicitly include at least one of the features. In the description of the present application, the meaning of "a plurality of" is two or more, unless explicitly and specifically defined otherwise.

The above description is merely specific implementations of the present application, but is not intended to limit the scope of protection of the present application. Any variation or replacement readily figured out by a person skilled in the art within the technical scope disclosed in the present application shall fall within the scope of protection of the present application. Therefore, the scope of protection of the present application shall be subject to the scope of protection of the claims.

What is claimed:

1. A flexibly removable eaves lamp, comprising:
a lamp body, a bottom of the lamp body being provided with a first vertically limiting portion extending in a first horizontal direction of the lamp body; and
a mount, a top of the mount being provided with a second vertically limiting portion extending in a first horizontal direction of the mount, the first horizontal direction of the mount and the first horizontal direction of the lamp body being a same direction,
wherein
the second vertically limiting portion engages with the first vertically limiting portion in a horizontally slidable manner, to limit a vertical movement of the lamp body;
the bottom of the lamp body is provided with a first horizontally limiting portion arranged on the first vertically limiting portion; the top of the mount is provided with a second horizontally limiting portion arranged on the second vertically limiting portion; and the second horizontally limiting portion removably engages with the first horizontally limiting portion, to limit a horizontal movement of the lamp body;
the first vertically limiting portion comprises:
a first vertically extending section having a first end connected to the bottom of the lamp body; and
a first horizontally extending section having one end connected to a second end of the first vertically extending section and a other end extending in a direction away from the second end of the first vertically extending section, the first horizontally extending section, the first vertically extending section and the lamp body enclosing a first guide groove therebetween; and
the second vertically limiting portion comprises:
a second vertically extending section having one end connected to the mount:
a second horizontally extending section, the other end of the second vertically extending section being connected to a first end of the second horizontally extending section connected to a second end of the second vertically extending section, the second horizontally extending section extending in a direction away from the second vertically extending section, and the second horizontally extending section, the second vertically extending section and the mount enclosing a second guide groove there between, and
the second horizontally extending section engages with the first guide groove in a horizontally slidable manner, and the second guide groove engages with the first horizontally extending section in a horizontally slidable manner, to limit the vertical movement of the lamp body.

2. The flexibly removable eaves lamp according to claim 1, wherein the mount has a mounting guide groove, the mounting guide groove and the second guide groove being arranged sequentially in the first horizontal direction of the mount, a width of the mounting guide groove gradually decreasing from outside to inside, and the mounting guide groove being in communication with the second guide groove.

3. The flexibly removable eaves lamp according to claim 2, wherein two mounting guide grooves are provided, which are respectively arranged at two ends of the second guide groove in a length direction thereof.

4. The flexibly removable eaves lamp according to claim 1, wherein the first horizontally limiting portion comprises a limiting slot, and the second horizontally limiting portion comprises a limiting protrusion, the limiting protrusion removably engaging with the limiting slot.

5. The flexibly removable eaves lamp according to claim 4, wherein outer edges on two horizontal sides of an end of the limiting protrusion facing away from the second vertically limiting portion are each provided with an arc-shaped portion extending from one end to the other end of the limiting protrusion in a width direction of the second guide groove.

6. The flexibly removable eaves lamp according to claim 4, wherein the limiting protrusion has a cross-section tapering in a direction away from the second vertically limiting portion.

7. The flexibly removable eaves lamp according to claim 4, wherein the limiting slot is provided in the first horizontally extending section; and
the second horizontally extending section comprises a first connecting section, a second connecting section and a third connecting section, the first connecting section, the second connecting section and the third connecting section being arranged spaced apart from one another in a length direction of the second horizontally extending section, and the limiting protrusion being provided on the second connecting section.

8. A flexibly removable eaves lamp, comprising:
a lamp body, a bottom of the lamp body being provided with a first vertically limiting portion extending in a first horizontal direction of the lamp body; and
a mount, a top of the mount being provided with a second vertically limiting portion extending in a first horizontal direction of the mount, the first horizontal direction of the mount and the first horizontal direction of the lamp body being the same direction,
wherein
the second vertically limiting portion engages with the first vertically limiting portion in a horizontally slidable manner, to limit a vertical movement of the lamp body;
the bottom of the lamp body is provided with a first horizontally limiting portion arranged on the first vertically limiting portion; the top of the mount is provided with a second horizontally limiting portion arranged on the second vertically limiting portion; and the second horizontally limiting portion removably engages with the first horizontally limiting portion, to limit a horizontal movement of the lamp body;
wherein two first vertically limiting portions are provided, which are arranged spaced apart from each other in a second horizontal direction of the lamp body, each of the first vertically limiting portions being provided with the first horizontally limiting portion; and two second vertically limiting portions are provided, which are arranged spaced apart from each other in a second horizontal direction of the mount, the second horizontal direction of the mount and the second horizontal direction of the lamp body being the same direction, each of the second vertically limiting portions being provided with the second horizontally limiting portion and slidably engaging with a corresponding first vertically limiting portion, and each of the second horizontally limiting portions removably engaging with a corresponding first horizontally limiting portion.

9. A flexibly removable eaves lamp, comprising:

a lamp body, a bottom of the lamp body being provided with a first vertically limiting portion extending in a first horizontal direction of the lamp body; and a mount, a top of the mount being provided with a second vertically limiting portion extending in a first horizontal direction of the mount, the first horizontal direction of the mount and the first horizontal direction of the lamp body being the same direction, wherein the second vertically limiting portion engages with the first vertically limiting portion in a horizontally slidable manner, to limit a vertical movement of the lamp body;

the bottom of the lamp body is provided with a first horizontally limiting portion arranged on the first vertically limiting portion; the top of the mount is provided with a second horizontally limiting portion arranged on the second vertically limiting portion; and the second horizontally limiting portion removably engages with the first horizontally limiting portion, to limit a horizontal movement of the lamp body;

the first vertically limiting portion comprises:

a first vertically extending section having a first end connected to the bottom of the lamp body; and a first horizontally extending section having one end connected to a second end of the first vertically extending section and the other end extending in a direction away from the second end of the first vertically extending section, the first horizontally extending section, the first vertically extending section and the lamp body enclosing a first guide groove therebetween; and the second vertically limiting portion comprises:

a second vertically extending section having one end connected to the mount;

a second horizontally extending section, the other end of the second vertically extending section being connected to a first end of the second horizontally extending section connected to a second end of the second vertically extending section, the second horizontally extending section extending in a direction away from the second vertically extending section, and the second horizontally extending section, the second vertically extending section and the mount enclosing a second guide groove there between, and wherein the second horizontally extending section engages with the first guide groove in a horizontally slidable manner, and the second guide groove engages with the first horizontally extending section in a horizontally slidable manner, to limit the vertical movement of the lamp body;

wherein the lamp body comprises:

a base provided with the first vertically limiting portion and the first horizontally limiting portion;

a circuit board arranged on a top of the base and having a light source;

a reflector cup arranged on the base and surrounding the light source; and a lamp cover connected to an outer edge of the reflector cup, the lamp cover covering the reflector cup and the light source and being configured to allow light from the light source to pass out of the lamp body.

* * * * *